United States Patent [19]

Goheen et al.

[11] Patent Number: 5,001,644
[45] Date of Patent: Mar. 19, 1991

[54] THROTTLE SPLIT MONITOR FOR AIRCRAFT WITH INTERMIXED ENGINES

[75] Inventors: Kenneth E. Goheen, Bellevue; Douglas O. Jackson, Mercer Island, both of Wash.

[73] Assignee: The Boeing Company, Seattle, Wash.

[21] Appl. No.: 424,849

[22] Filed: Oct. 19, 1989

[51] Int. Cl.⁵ .............................................. G06F 15/46
[52] U.S. Cl. .............................. 364/431.01; 60/224
[58] Field of Search ................... 364/431.01, 433, 434, 364/431.03; 244/182, 76 J; 60/224; 340/963, 966

[56] References Cited

U.S. PATENT DOCUMENTS

| | | | |
|---|---|---|---|
| 4,212,444 | 6/1980 | Stephan | 364/433 |
| 4,220,993 | 9/1980 | Schloeman | 364/434 |
| 4,410,948 | 10/1983 | Doniger et al. | 364/431.07 |
| 4,546,353 | 10/1985 | Stockton | 60/224 |
| 4,569,021 | 2/1986 | Larson et al. | 364/433 |
| 4,912,642 | 3/1990 | Larsen et al. | 364/431.01 |

*Primary Examiner*—Parshotam S. Lall
*Assistant Examiner*—Tyrone Queen
*Attorney, Agent, or Firm*—Christensen, O'Connor, Johnson & Kindness

[57] ABSTRACT

A throttle split monitor (11) for monitoring a multiple engine aircraft having an automatic throttle (A/T) control system is disclosed. The throttle split monitor (11) comprises a throttle angle section (13), a tachometer section (15) and a throttle limit section (17). The throttle angle section receives signals containing information representative of the positions of the throttles of an aircraft. Based on the throttle position information, the throttle angle section determines the throttle split angle between the positions of the throttles associated with similarly placed engines on opposite sides of the aircraft and adjusts said throttle split angle to compensate for throttle position differences associated with engines producing equal levels of thrust. The throttle angle section produces an A/T disengage signal when said adjusted throttle split angle exceeds a predetermined value. Similarly, the tachometer section receives signals containing information representative of the rate of change of the throttles of the aircraft. Based on the rate-of-change information, the throttle angle section determines the difference between the rate of change of the throttles associated with similarly placed engines located on opposite sides of the aircraft and adjusts said difference to compensate for throttle rate-of-change differences associated with engines producing equal levels of thrust. The tachometer section produces an A/T disengage signal when said adjusted throttle difference exceeds a predetermined value. The throttle limit section limits engine throttle commands such that the throttle angle section and the tachometer section will not produce A/T disengage signals under normal operation.

10 Claims, 3 Drawing Sheets

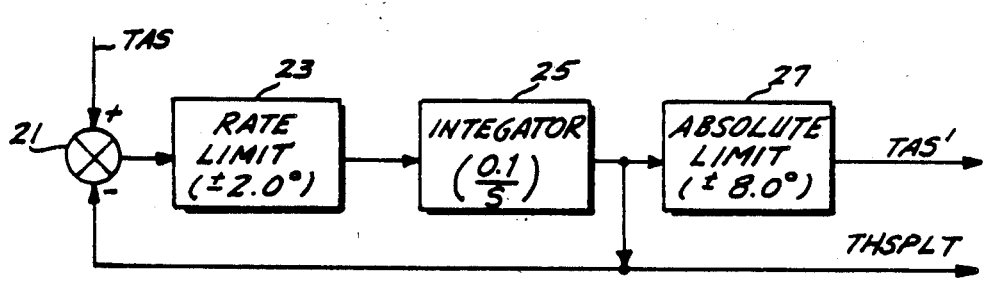
_Fig. 2._
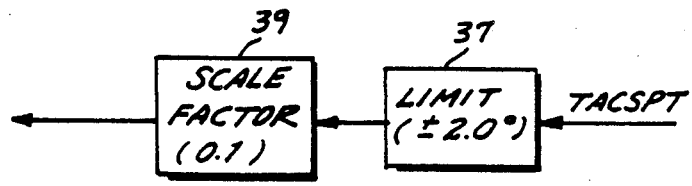
_Fig. 3._

THROTTLE SPLIT MONITOR FOR AIRCRAFT WITH INTERMIXED ENGINES

FIELD OF THE INVENTION

This invention relates to monitors, and more particularly, to throttle split monitors for multi-engine aircraft with an automatic throttle system for independently controlling each engine.

BACKGROUND OF THE INVENTION

Many maneuvers and procedures of modern, multi-engine aircraft are controlled by on-board automatic control systems. An automatic throttle (A/T) system is an example of such a system. An A/T system receives various engine and avionic signals and controls the amount of thrust produced by the engines. More specifically, in response to its input signals, an A/T system produces a thrust control signal for each engine. The thrust control signals control the position of the throttle for each engine so that each engine produces the thrust called for by a suitable source, such as an autopilot, for example.

Some maneuvers, such as an aircraft landing maneuver, require equal thrust from the engines mounted on opposing sides of the aircraft. Unequal, i.e., asymmetrical, thrust levels may cause undesirable lateral excursions of the aircraft during landing. During automatic landing maneuvers, the A/T system rather than the pilot issues thrust commands to the engines designed to cause the engines to produce equal thrusts.

During automatic landing maneuvers when the A/T system is engaged, a failure in the A/T system will, most likely, cause the engines to produce unequal thrusts. More specifically, a failure in a hardware component in the A/T system or a problem with the software used to control the A/T system may cause the A/T system to produce a throttle control signal that rapidly drives one of the throttles fully on or fully off. This throttle action produces a corresponding engine thrust that is substantially different from the thrust level of the outer engine(s), resulting in an excessive lateral excursion by the aircraft.

One technique used in the prior art to detect unequal thrust levels during automatic landing maneuvers monitors the position of the throttles. This prior art techniques interprets a difference in throttle positions as a difference in thrust levels since throttle position is related to the thrust produced by the corresponding engine. In other words, a difference, commonly called a split, in throttle position is interpreted by a throttle split monitor as unequal thrust levels between the related engines. Typically, such a technique allows for a maximum split between throttles to accommodate for system and component variations. The maximum split is usually a fixed and predetermined value. Accordingly, variations in thrust levels are permitted as long as the actual throttle split is less than the predetermining maximum throttle split. Once the actual throttle split exceeds this predetermined throttle split, the throttle split monitor trips and disengages the A/T system.

While the just described prior art technique works well with aircraft having identical engines, it does not work well with aircraft having intermixed, i.e., dissimilar, engines. As is well known in the aircraft industry, dissimilar engines most likely have different operating characteristics. Because of the different operating characteristics, the throttles associated with the dissimilar engines will have different positions for a given thrust level. Accordingly, when an aircraft having intermixed engines is performing an automatic landing maneuver, which, as noted above, requires that the thrust produced by the engines be equal, there will be a "normal" throttle split between the engine throttles. Unfortunately, this "normal" throttle split may exceed the maximum throttle split provided for by prior art throttle split monitors and, thus, cause an A/T system to be inadvertently disengaged. Once the A/T system is disengaged, the automatic landing maneuver must be aborted and the aircraft landed manually by the pilot. Even though pilots are trained to land aircraft, such a change in a landing maneuver is highly undesirable, especially when an aircraft is in its final approach, and very near to the ground.

Another prior art technique for detecting unequal thrusts during a landing maneuver involves directly comparing the thrust levels of the different engines. In this technique, when unequal thrust levels are detected, the A/T system applies appropriate thrust control signals to the throttle servos, resulting in throttle settings being changed to balance out engine thrust. Unfortunately, there is an inherent lag between throttle change and engine response thereto. The lag in engine response may cause a monitor to trip, resulting in the A/T system's being disengaged. In an attempt to prevent the monitor from inadvertently disengaging the A/T system, this type of prior art technique incorporates a delay that allows the engine time to respond to the throttle motion. Unfortunately, this delay may result in excessive lateral excursions of the aircraft before a failure in throttle motion is detected. Thus, this technique is undesirable regardless of whether the aircraft engines are similar or dissimilar.

As will be readily appreciated from the foregoing discussion, there has developed the need for a monitor that detects unequal thrust levels on multi-engine aircraft having intermixed engines. Such a monitor should discriminate between normal throttle splits that are the result of the different operating characteristics of the dissimilar engines and excessive throttle splits that cause the engines to produce unequal thrusts, such as might be caused by a failure in an aircraft's automatic throttle control system. The present invention is a throttle split monitor designed to achieve these results.

SUMMARY OF THE INVENTION

In accordance with this invention, a throttle split monitor for use in multi-engine aircraft, particularly multi-engine aircraft with intermixed engines, having an automatic throttle (A/T) system is provided. The throttle split monitor includes a throttle angle section, a tachometer section and a throttle limit section. The throttle angle section receives signals denoting the position of the throttles and causes autothrottle disengagement if the throttle split angle plus a throttle split bias term exceeds a limit. Preferably, the throttle split bias term offsets the split angle such that the throttle angle section operates about an offset position that approximately corresponds to the average split needed to equalize thrust. The throttle split bias term is designed to slowly change in order to accept equalization variations without loss of the ability to detect throttle split failures critical to the automatic landing of an aircraft. The tachometer section receives signals denoting the rate of change of throttle position and causes autothrottle disengagement if the integrated value of the difference in the rate of change becomes excessive. Preferably, a tachometer bias term is generated that offsets the difference value to account for normal equalization changes without affecting the ability to detect split failures critical to the automatic landing of an aircraft. The throttle limit section individually limits autothrottle commands so that during normal operation autothrottle the throttle angle and tachometer sections will not be trapped, i.e., cause autothrottle disengagement. This result is accomplished by using the throttle split bias term and a tachometer split term to calculate a limit adjustment that prevents throttle angle and tachometer section tripping during normal autothrottle operation.

As will be appreciated from the foregoing summary, the invention provides a throttle split monitor that responds when unequal thrusts are produced by aircraft engines, particularly dissimilar aircraft engines of a multi-engine aircraft during an automatic landing procedure. For purposes of improved reliability, preferably one of the redundant sections of the throttle split monitor is implemented in hardware form and the other in software form. For example, the throttle angle section could be implemented in software form and the tachometer section in hardware form. Such an implementation increases reliability by limiting reliance on common components, such as the CPU of a computer programmed to carry out the functions of both sections.

BRIEF DESCRIPTION OF THE DRAWINGS

The foregoing and other features and advanatges of this invention will become more readily appreciated as the same becomes better understood by reference to the following detailed description when taken in conjunction with the accompanying drawings, wherein:

FIG. 2 is a functional block diagram of a throttle split bias circuit suitable for use in the throttle angle section of the throttle split monitor illustrated in FIG. 1;

FIG. 3 is a functional block diagram of a tachometer split bias circuit suitable for use in the tachometer section of the throttle split monitor illustrated in FIG. 1.

DETAILED DESCRIPTION OF THE PREFERRED EMBODIMENT

There has developed a need for detecting unequal thrust levels produced by dissimilar engines on an aircraft during an automatic landing maneuver. The present invention is a throttle split monitor designed to discriminate between normal throttle splits associated with equal engine thrusts produced by dissimilar engines and excessive throttle splits associated with unequal thrusts, such as might be caused by an automatic throttle (A/T) system failure. When an excessive throttle split is detected, the throttle split monitor of the present invention disengages the A/T system and warns the pilot of the failure. While, for ease of understanding, the invention is illustrated and described in functional block form, it is to be understood that many of the described functions can be performed with hardware or software, software being preferred. Mosy ideally, for reliability purposes, the redundant sections of the throttle split monitor will be performed in separate calculation units, which may be entirely software based, a combination of software and hardware, or entirely hardware based.

Figure 1:
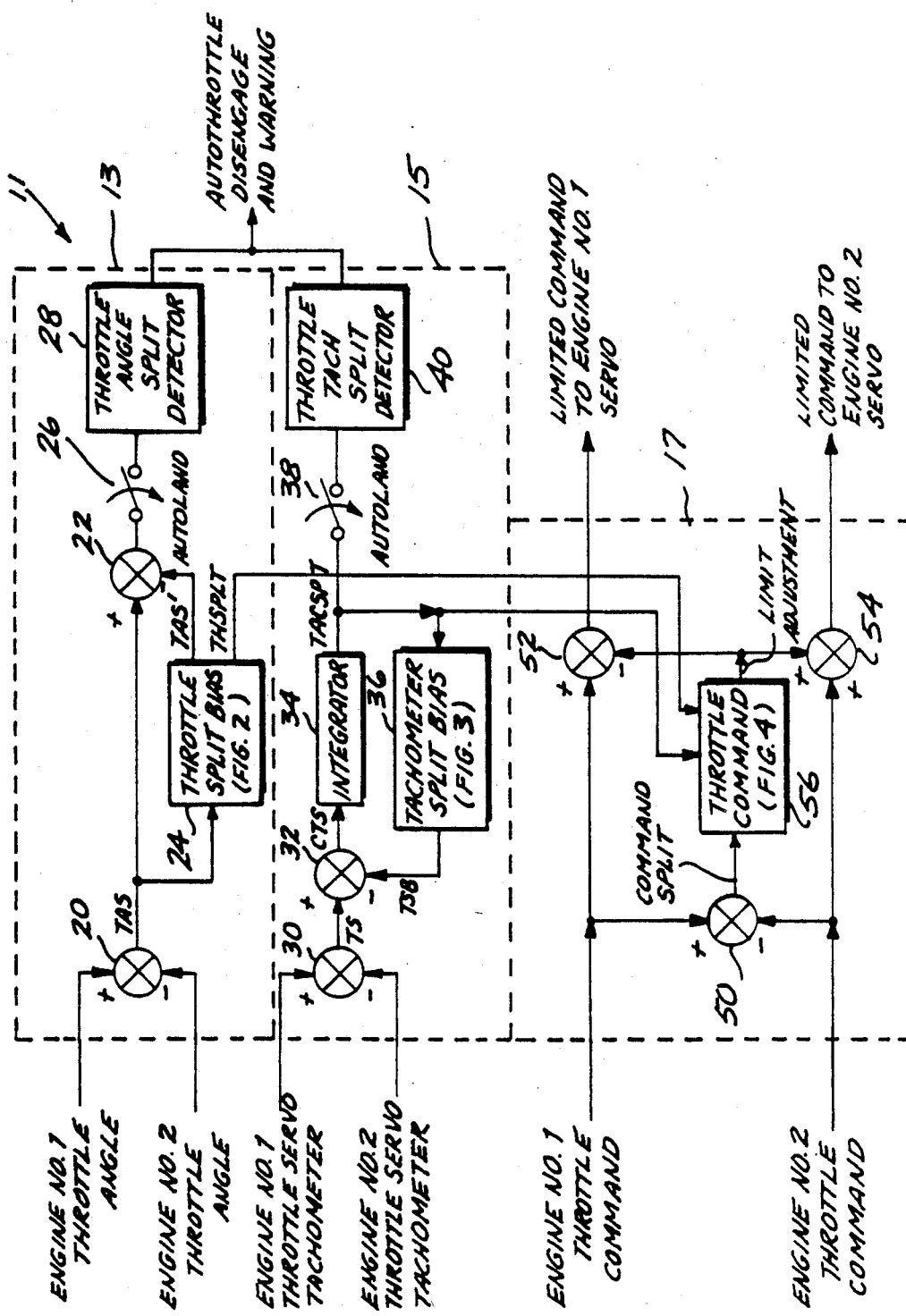
FIG. 1 is a functional block diagram of a throttle split monitor formed in accordance with the present invention.

FIG. 1 illustrates, in functional block diagram form, a throttle split monitor 11 formed in accordance with the present invention. As will become better understood from the following discussion, the throttle split monitor 11 has the ability to discriminate between normal throttle splits and excessive throttle splits associated with equal and unequal thrusts produced by intermixed, dissimilar engines mounted on opposite sides of a jet aircraft. The throttle split monitor 11 comprises: a throttle angle section 13; a tachometer section 15; and a throttle limit section 17. The throttle angle section 13 receives throttle angle signals representing the position or angle of the throttle of each side-mounted engine of the aircraft. Similarly, the tachometer section 15 receives throttle rate-of-change signals from the throttle tachometer of each side-mounted engine. While the illustrated embodiment of the invention is designed for use on two-engine jet aircraft, it is to be understood that the present invention can be used on other aircraft-four-engine aircraft, for example.

The angular position of each engine throttle of an aircraft is related to the thrust produced by the associated engine. The throttle position signals that denote throttle angle, which may be in the form of analog voltages whose magnitudes are proportional to the angular position of the associated throttle, thus denote the thrust produced by the associated engine. As will become better understood from the following discussion, the throttle angle section 13 uses the throttle position signals, (i.e., voltage magnitudes) to compute a difference, or split, between the throttle position and, thus, the split between engine thrust. When an excessive throttle split angle is detected, the throttle angle section produces an output that disengages the A/T system and, preferably, causes an alarm that warns the pilot of the aircraft so that he can take corrective action.

As will become better understood from the following discussion, an important feature of a throttle split monitor formed in accordance with the present invention is that the throttle angle section 13 produce a throttle split bias term whose value presents A/T disengagement in response to the normal split that occurs between throttles when intermixed engines are producing equal levels of thrust. More specifically, the throttle split bias term creates an offset that prevents the production of an A/T disengagement signal is response to the normal throttle angle split that occurs when equal thrust is being produced by dissimilar engines. Rather, an A/T disengagement signal is produced only when an excessive throttle angle split is detected, such as typically occurs as a result of an A/T system failure.

As noted above, the tachometer section 15 receives throttle rate-of-change signals from the throttles associated with each of the side-mounted engines of the aircraft. More specifically, in an aircraft having an automatic throttle control system, each throttle mechanism includes a throttle servo motor (not shown) connected to the corresponding throttle lever. The throttle servos receive thrust control signals from the A/T system and cause appropriate throttle motion of the associated throttle. Each throttle servo is paired with a throttle servo tachometer. It is the throttle servo tachometers that produce the throttle rate-of-change signals. Normally, the throttle rate-of-change signals are in the form of analog voltages whose magnitude is proportional to the rate of change in the angular position of the related throttle, i.e., degrees per second.

The tachometer section 15 uses the throttle rate-of-change signal data to detect a difference, or split, in the position of the throttles based on the motion of the throttles by integrating the difference between the throttle rate-of-change signals. When the difference in throttle motion denotes an excessive throttle split, the tachometer section 15 causes the A/T disengagement signal to be produced. While formed in a different manner, in essence, the tachometer section 15 generates substantially the same information as the throttle angle section 13, i.e., a signal whose value depends on throttle split angle.

As will become better understood from the following discussion, another important feature of a throttle split monitor 11 formed in accordance with the present invention is that the tachometer section 15 produces a tachometer split bias term that allows the tachometer section 15 to ignore slight variations in throttle motion associated with intermixed engines. Slight variations in throttle motion may be caused by the difference operating characteristics of the intermixed engines. That is, for example, a call for the same increase in the thrust produced by two intermixed engines will, in many instances, result in slightly different throttle rates of change. The difference is due to the different characteristics of the engines. The tachometer split bias term allows the tachometer section 15 to ignore such normal rate-of-change differences.

Another important feature of a throttle split monitor 11 formed in accordance with the present invention is the use of the throttle split bias and the tachometer split terms to limit the throttle control commands produced by the A/T system so as not to cause excessive throttle lever angle splits during normal operation, with normal operation being the absence of a failure. As illustratively shown in FIG. 1, and more fully described below, A/T system throttle commands are separately limited. The limit level is based on the value of the throttle split bias term and the value of the tachometer split term.

Turning now to a more detailed description of the embodiment of the invention illustrated in FIG. 1, the throttle angle section 13 comprises: two two-input summing junctions 20 and 22; a throttle split bias circuit 24; an autoland switch 26; and a throttle angle split detector 28. Each of the summing junctions 20 and 22 includes a noninverting input, denoted by a plus (+) sign, and an inverting input, denoted by a minus (−) sign. The two throttle angle signals derived from the throttles of the aircraft are each applied to one of the inputs of the first summing junction 20. As discussed above, and in accordance with the preferred embodiment of the present invention, the throttle angle signals are in the form of voltages whose magnitude is proportional to the angular position of the related throttle. Since the first summing junction 20 is a subtractive junction, the difference between magnitudes of the voltages applied to the inputs of this summing junction is produced at the output. This voltage is designated a TAS signal in FIG. 1. The TAS signal is applied to the noninverting input of the second summing junction 22 and to the input of the throttle split bias circuit 24.

As noted above, the throttle split bias circuit 24 computes a throttle split bias term. FIG. 2 illustrates in functional block form the presently preferred way of producing the throttle split bias term. More specifically, FIG. 2 illustrates a network of blocks that include: a two-input subtractive summing junction 21; a rate limit circuit 23; an integrator 25; and an absolute limit circuit 27. The TAS signal is applied to the noninverting input of the summing junction 21. The output of the summing junction 21 is applied through rate limit circuit 23 to the input of the integrator 25. The output of the integrator 25 is applied to the input of the absolute limit circuit and to the inverting input of the summing junction 21. The output of the integrator, designated THSPLT, forms the throttle split bias term that is applied to the throttle limit section 19 in the manner described below. The throttle split bias term used by the throttle split section 13, designated TAS', is the same as THSPLT limited by the absolute limit circuit 27.

The rate limit ciruit limits the output of the summing junction to a predetermined level, such as the voltage equivalent of a ±2.0° difference between throttle angles. (A suitable range of values is 0.0° to ±5.0°.) The thusly limited voltage is intetraged by the integrator, which preferably has a scale factor well below 1.0—0.1, for example. (A suitable range is 0.0 to 0.5.) Thus, the Laplace transform of the integrator is 0.1/s. The absolute limit circuit limits the output of the integrator to a specific level, such as the voltage equivalent of a throttle split angle of ±8.0°. (A suitable range is ±5.0° to ±10.0°.)

As will be better understood from the following discussion of the remaining elements of the throttle angle section 13, TAS' forms an offset term that allows the throttle angle section to operate an offset position that corresponds to the average split between throttle angles that occurs when intermixed engines produce equal thrust. Because TAS' changes slowly due to the nature of the integrator, thrust equalization variatons in throttle angle are accepted and will not cause A/T disengagement. Contrariwise, split angle differences critical to an automatic landing remain detectable. This result is achieved because the integrator 25, in effect, smooths out slow changes, but does not smooth out rapid changes.

Returning now to FIG. 1, TAS' is applied to the inverting input of the second summing junction 22. Thus, the second summing junction subtractively combines TAS and TAS'. When an automatic landing maneuver begins, the throttle split bias circuit 24 is producing a TAS' voltage that is equal to the TAS voltage, provided the throttle position was stable just prior to the commencement of the procedure. Accordingly, the TAS and TAS' voltages initially cancel one another so that the output of the second summing junction 22 is substantially zero. As noted above, the value of the TAS' voltage responds to changes in the TAS voltage. A slow change in the throttle angle split, which causes a slow change in the TAS voltage, is offset because TAS' voltage tracks slow changes. As a result, the output on the summing junction 22 remains at substantially zero or, at least, below some predetermined minimum value. Contrariwise, a rapid change in the throttle angle split, which causes a rapid change in the TAS voltage, such as might occur due to a failure in the A/T system, is not offset because TAS' does not track fast TAS changes. The resulting large difference between the TAS voltage and the TAS' voltage is produced at the output of the second summing junction 22, which output is applied to the throttle angle split deflector 28 through the autoland switch 26.

The autoland switch 26 is closed at some predetermined point in an automatic landing maneuver, such as at the commencement of glideslope or localizer capture. When this occurs, the output of the second summing junction 22 is applied to the throttle angle split detector 28. Because the output of the secondary summary junction 22 remains near zero when the difference between the throttle angle signals, i.e., TAS, is small, the throttle angle split detector does not produce an A/T disengage signal. Contrariwise, a large difference in the throttle angle, i.e., large TAS, such as might occur due to an A/T system failure that causes one of the throttles to drive fully on or fully off, will cause an A/T disengage signal to be produced. More specifically, a large TAS will cause a large voltage on the output of the second summing junction 22. If the second summing junction voltage exceeds a predetermined level, the throttle angle split detector will produce an A/T disengage signal.

When the aircraft is not performing an automatic landing maneuver, the autoland switch 26 is open. As a result, the summing junction 22 is disconnected from the throttle angle split detector 28. Thus, the angle split monitor 10 will not cause the A/T system to disengage when the aircraft is not performing an automatic landing maneuver, no matter how large the throttle angle split.

The tachometer section 15 of the throttle split monitor 11 depicted in FIG. 2 comprises: two two-input summing junctions 30 and 32; an integrator 34 having a Laplace transform of 1/s; a tachometer split bias circuit 36; an autoland switch 38; and a throttle tach split detector 40. Each of the summing junctions 30 and 32 has a noninverting input, denoted by a plus (+) sign, and an inverting input, denoted by a minus (−) sign. As noted above, the tachometer section 15 receives throttle rate-of-change signals from the throttle servo tachometers. The throttle rate-of-change signal from one throttle servo tachometer is applied to the noninverting input of first summing junction 30 and the throttle rate-of-change signal from the other throttle servo tachometer is applied to the inverting input of the first summing junction 30. As also noted above, and in accordance with the preferred embodiment of the invention, the throttle rate-of-change signals are in the form of voltages whose magnitude are proportional to the rate of change of the angular position of the associated throttles. In any event, the difference between the magnitude of the voltages applied to the inputs of the first summing junction 30 is a throttle tach split signal, designated TS. TS is applied to the noninverting input of the second summing junction 32. The output of the second summing junction 32 is applied to the input of the integrator 34. The output of the integrator 34, designated TACSPT, is applied to the input of the tachometer split bias circuit 36, and the output of the tachometer split bias circuit 36 is applied to the inverting input of the second summing junction 32.

As noted above, the tachometer split bias circuit 36 produces a tach split bias term, preferably in the form of a voltage, designated TSB in FIG. 1. The difference between the magnitudes of TS and TSB is a compensated tachometer split voltage, designated CTS. CTS is integrated by integrator 34 and produces the throttle angle split signal previously designated TACSPT. In addition to being applied to the input of the tachometer split bias circuit 36, TACSPT is applied through autoland switch 38 to the throttle tach split detector 40. The autoland switch 38 is closed when the aircraft is performing an automatic landing maneuver and open when an automatic landing maneuver is not being performed. Thus, TACSPT is applied to the throttle tach split detector 40 only during an automatic landing maneuver. As will be understood from this descrption TACSPT is a throttle angle split signal whose value is based on rate of change of throttle position, rather than throttle position, i.e., TACSPT is a rate-related throttle angle split signal.

FIG. 3 is a functional block diagram of a tachometer split bias circuit suitable for use in the tachometer section of the throttle split monitor illustrated in FIG. 1. The tachometer split bias circuit illustrated in FIG. 3 comprises: a limit circuit 37; and a scale factor circuit 39. The output of the integrator, i.e., TACSPT, is applied through the limit circuit 37 to the input of the scale factor circuit. The output of the tachometer split bias circuit, i.e., TSB, is formed at the output of the scale factor circuit.

The limit circuit 37 limits the scale factor input to a predetermined level, preferably the voltage equivalent of ±2.0°. (A suitable range is ±1.0° to ±3.0°.) The scale factor circuit scales the output of the limit circuit by multiplying the output of the limit circuit by a predetermined scale factor, preferably 0.1. (A suitable scale factor range is 0.05 to 0.25.)

As will be readily appreciated by those skilled in the A/T control system art, the tachometer split bias circuit creates a slow washout on the integrator that allows the throttle tach split detector to adapt to the normal difference between throttle rates of change that occur when intermixed engines are used on an aircraft. The limit circuit restricts the washout to a value that prevents rate-of-change differences created by system failures from being masked, i.e., not recognized.

When an A/T landing maneuver is commenced, the output of the integrator, i.e., TACSPT, is zero, assuming that the outputs of the throttle servo tachometers are equal, which is normally the case. As will be understood from the previous discussion of FIG. 3, TSB is related to TACSPT by a scale factor. The scale factor limits the amount TSB changes in response to a TACSPT change. In essence, tachometer split bias circuit 36 is a low gain feedback circuit that causes a lag in the response of the TACSPT voltage to low voltage values of TS and an integrated response of TACSPT to higher voltage values of TS. Accordingly, small values of TS are timely compensated for by TSB. As a result, the input to the throttle tach split detector 40 remains low, i.e., near zero. Contrariwise, a large sustained difference between the throttle servo tachometer signals, represented by a large TS value, is not timely compensated for by TSB. The large difference between TS and TSB, integrated by integrator 34, creates a large TACSPT voltage.

As noted above, during an automatic landing maneuver, autoland switch 38 is closed, which causes the output of the integrator 34 to be applied to the throttle tach split detector 40. Because the output of the integrator 34 remains near zero when the difference between the throttle servo tachometer signals, i.e., TS, is small, the throttle tach split detector does not produce an A/T disengage signal. Contrariwise, a large difference in the rate of change of the throttles, i.e., a large TS, such as might occur due to an A/T system failure that causes one of the throttles to drive fully on or fully off, will cause an A/T disengage signal to be produced. More specifically, a large TS will cause a large TACSPT voltage. If the TACSPT voltage exceeds a predetermined level, the throttle tach split detector will produce an A/T disengage signal.

As noted above, during the automatic landing of an aircraft it is desirable to produce equal thrust from the engines mounted on either side of the aircraft. This is accomplished by the A/T system producing throttle commands that, ideally, equalize the thrust from the engines. When input signals received by the A/T system indicate a thrust imbalance between the engines, the A/T system produces appropriate throttle commands aimed at equalizing the thrust levels. One method commonly used to equalize the thrusts is to increase the thrust of the engine producing the lower thrust and decrease the thrust of the engine producing the higher thrust. Typically, these thrust adjustments result in a throttle split. As noted above, in aircraft with intermixed engines, the throttle split can be greater than normal. While the invention can compensate for most such throttle splits, unfortunately, if not limited, some "normal" throttle splits can cause the throttle angle section 13 and/or tachometer section 15 of the throttle split monitor 11 of the present invention to "trip" and disengage the A/T system. The throttle limit section 17 is included to prevent this result from occurring.

The throttle limit section of the embodiment of the invention illustrated in FIG. 1 limits magnitude of the commands applied to the engine servos based on the values of the THSPLT signal produced by the throttle split bias circuit 24 and the TACSPT signal produced by the integrator 34. The commands are limited such that in normal operation the throttle angle section 13 and/or the tachometer section will not be tripped, i.e., produce an A/T disengage signal.

As shown in FIG. 1, the throttle limit section includes three two-input summing junctions 50, 52 and 54; and a throttle command limit circuit 56. The first and second summing junctions 50 and 52 have an inverting input and a noninverting input, designated by minus (−) and plus (+) signs, respectively. Both inputs of the third summing junction 54 are noninverting. The throttle command signals produced by the A/T system for both engines are applied to the inputs of the first summing junction 50, one to the noninverting input and the other to the inverting input. The throttle command for one engine is also applied to the noninverting input of the second summing junction 52 and the throttle command for the second engine is applied to one of the noninverting inputs of the third summing junction 54. The output of the first summing junction, designated a COMMAND SPLIT signal, is applied to the throttle command limit circuit 56. The throttle command limit circuit also receives the THSPLT signal produced by the throttle split bias circuit 24 and the TACSPT signal produced by the integrator 34. The output of the throttle command limit circuit 56, designated a LIMIT ADJUSTMENT signal, is applied to the inverting input of the second summing junction 52 and to the other noninverting input of the third summing junction 54.

Figure 4:
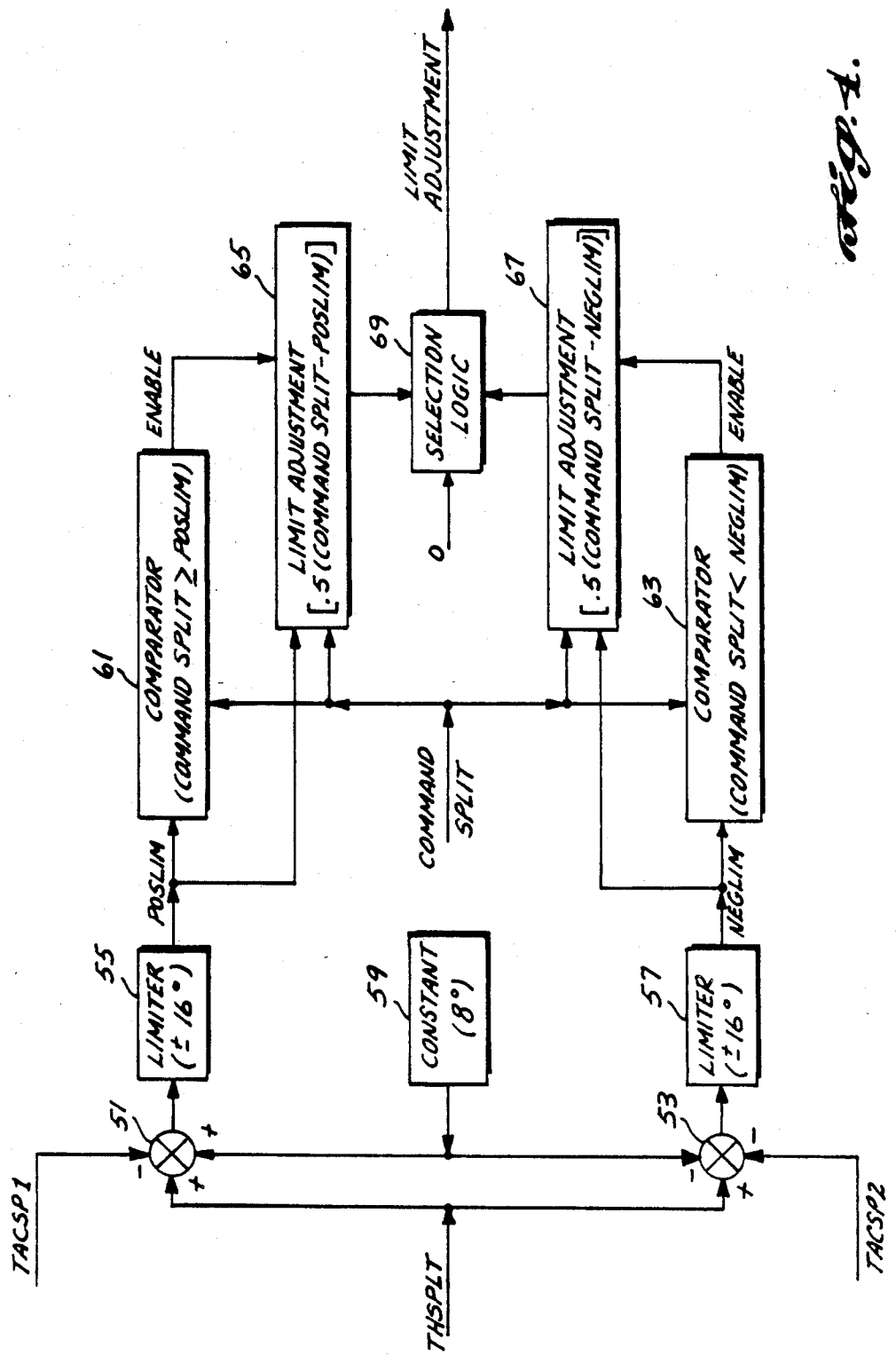
FIG. 4 is a functional block diagram of a throttle commands limit circuit suitable for use in the throttle limit section of the throttle split monitor illustrated in FIG. 1.

FIG. 4 illustrates a throttle command limit circuit suitable for use in the throttle limit section 17 of the throttle split monitor 11 illustrated in FIG. 1. The throttle command limit circuit illustrated in FIG. 4 comprises: two three-input summing junctions 51 and 53; two limiter circuits 55 and 57; a constant voltage source 59; two comparators 61 and 63; two limit adjustment circuits 65 and 67; and adjustment logic 69. The first summing junction 51 has two noninverting inputs and one inverting input, and the second summing junction 53 has two inverting inputs and one noninverting input. The THSPLT signal is applied to one of the noninverting inputs of the first summing junction 51 and to the noninverting input of the second summing junction 53. A signal designated TACSP1 is applied to the inverting input of the first summing junction 51 and a signal designated TACSP2 is applied to one of the inverting inputs of the second summing junction 53. TACSP1 and TACSP2 are based on TACSPL, which is based on TACSPT. More specifically, TACSPT is applied to a positive and negative limiter (not shown) to obtain TACSPL. Preferably the limit value is 2.0, with 0.5 to 4.0 being an acceptable range. TACSP1 and TACSP2 are based on TACSPL in accordance with the relationship: if TACSPL$\geq$0.0, TACSP1=TACSPL and TACSP2=0.0; if TACSPL<0.0, TACSP1=0.0 and TACSP2=TACSPL.

The output of the constant voltage source is applied to the remaining inputs of the first and second summing junctions 51 and 53, i.e., to a noninverting input of the first summing junction and to an inverting input of the second summing junction. Preferably, the scale factor circuit produces a voltage representative of a throttle split angle of 8.0°. (A suitable range is 6.0° to 10.0°.)

The output of the first summing junction 51 is applied to the input of the first limiter circuit 55, and the output of the second summing junction 53 is applied to the input of the second limiter circuit 55. Preferably, the first and second limiter circuits limit their outputs to voltages equal to ±16.0° throttle split angle. (A suitable range is ±10.0° to ±20.0°.) Like the other limit circuits, the output voltages of the first and second limiter circuits are the same as their input voltages, unless the input voltages exceed their limit, in which case the output voltage is the limit value. The output of the first limiter circuit 55 is a signal designated POSLIM and the output of the second limiter circuit 57 is a signal designated NEGLIM. POSLIM is applied to one input of the first comparator 61 and NEGLIM is applied to one input of the second comparator 63. COMMAND SPLIT, produced at the output of the first summing junction of the throttle limit section 17 illustrated in FIG. 1, is applied to the other inputs of both the first and second comparators 61 and 63.

The first comparator produces an ENABLE signal only if COMMAND SPLIT$\geq$POSLIM and the second comparator 63 produces an ENABLE output signal only if COMMAND SPLIT<NEGLIM. The ENABLE signal produced by the first comparator 61 is applied to an enable input of the first limit adjustment circuit 65. The first limit adjustment circuit also receives POSLIM and COMMAND SPLIT. When enabled, the first limit adjustment circuit produces an output signal whose value is determined by the expression:

$$0.5(\text{COMMAND SPLIT} - \text{POSLIM})$$

The ENABLE signal produced by the second comparator 63 is applied to the enable input of the second limit adjustment circuit. The second limit adjustment circuit also receives NEGLIM and COMMAND SPLIT. When enabled, the second limit adjustment circuit produces an output signal whose value is determined by the expression:

0.5(COMMAND SPLIT−NEGLIM)

The outputs of the first and second limit adjustment circuits are each applied to one input of the selection logic 69. A zero (0) level signal is applied to a third input of the selection logic. The output of the selection logic is the LIMIT ADJUSTMENT signal.

As will be readily appreciated from view FIG. 4, only one or the other, but not both, of the comparators 61 and 63 will produce an ENABLE signal. Alternatively, neither will produce an ENABLE signal. Whether one, the other, or neither of the comparators produces an ENABLE signal depends on the value of COMMAND SPLIT vis-a-vis POSLIM and NEGLIM. In any event, if an ENABLE signal is produced, the value of LIMIT ADJUSTMENT will be equal to the output of the enabled limit adjustment circuit 65 or 67. If neither comparator 61 or 63 produces an ENABLE signal, the value of the LIMIT ADJUSTMENT signal will be zero.

During an automatic landing maneuver, the throttle commands produced by the A/T system attempt to equalize the thrust produced by the engines. When the engines are intermixed, throttle commands most likely produce a throttle split. The THSPLT and TACSPT voltages apply absolute and rate limits to the throttle commands that limit the resulting throttle split to a value that will not cause the throttle split monitor of the present invention to trip and disengage the A/T system. More specifically, THSPLT is used to limit the throttle split caused by the throttle commands to a value that will prevent the throttle angle split detector 13 from tripping during normal operation. Similarly, TACSPT is used in the same logic to provide an additional limit on the throttle movement called for by the A/T throttle commands, which should provide enough margin to prevent the throttle tach split detector 40 from tripping.

As can be readily appreciated from the foregoing description, the invention provides a throttle split monitor for discriminating between excessive throttle splits caused by a fault in the automatic throttle system (which results in unequal thrust between the respective engines) and normal throttle splits caused by the different characteristics of dissimilar, or intermixed, engines when the dissimilar engines are producing equal thrust. While a preferred embodiment of the invention has been illustrated and described herein, it is to be understood that various changes can be made. For example, as noted above, the throttle split monitor of the present invention can be used in aircraft having more than two engines. Further, while other, simpler systems exist, the throttle split monitor of the present invention functions equally well on aircraft having identical engines, i.e., no intermixing of engines. Also, while illustrated in function block form for ease of description and understanding, it is to be understood that the various functions can be carried out by way of software, i.e., by programming a computer to perform the described functions. While software may be preferred in many control systems in the present invention it may in many instances be more desirable to implement one of the redundant sections, such as the tachometer section 15, in hardware form and the other redundant section, i.e., the throttle angle section 13, in software form. In any event, as noted above, for reliability purposes, it is desirable that these sections be made as separate and independent as possible. In summary, within the scope of the appended claims, it is to be understood that the invention can be practiced otherwise than as specifically described herein.

The embodiments of the invention in which an exclusive property or privilege is claimed are defined as follows:

1. A throttle split monitor for monitoring the engines of a multi-engine aircraft having an automatic throttle (A/T) control system, said throttle split monitor comprising:
   (a) a throttle angle section for:
      (i) receiving signals containing information representative of the positions of the throttles of an aircraft;
      (ii) determining the throttle split angle between the position of the throttles associated with engines located on opposite sides of said aircraft equal distances from the longitudinal centerline of the fuselage of the aircraft;
      (iii) adjusting said throttle split angle to compensate for throttle position variations associated with engines producing equal levels of thrust; and
      (iv) producing an A/T disengage signal when said adjusted throttle split angle exceeds a predetermined value; and
   (b) a tachometer section for:
      (i) receiving signals containing information representative of the rate of change of the positions of said throttles of said aircraft;
      (ii) determining the difference between the rate of change of the throttles associated with said engines located on opposite sides of said aircraft equal distances from the longitudinal centerline of the fuselage of the aircraft;
      (iii) adjusting said difference for throttle rate-of-change variations associated with engines producing equal levels of thrust; and
      (iv) producing an A/T disengage signal when said adjusted difference exceeds a predetermined value.

2. A throttle split monitor as claimed in claim 1, wherein said throttle angle section also determines a throttle split bias term that tracks slow changes in said throttle split angle and wherein said throttle angle section adjusts said throttle split angle by subtractively combining said throttle split angle with said throttle split bias term.

3. A throttle split monitor as claimed in claim 2, wherein said tachometer section adjusts said difference by integrating a term formed by subtractively combining the difference between said rate of change of said throttles with a term formed by scaling the results of said integration.

4. A throttle split monitor as claimed in claim 3, including a throttle limit section for receiving said throttle split bias term from said throttle angle section and the results of said integration from said tachometer section and limiting the throttle commands for the associated engines such that normal throttle commands produced by the A/T control system will not cause said throttle angle section or said tachometer section to produce A/T disengage signals.

5. The throttle split monitor claimed in claims 2, 3, or 4, wherein said throttle angle section produces said throttle split bias term by slowly integrating a term formed by subtractively combining the results of said integration with said throttle split angle, whereby said throttle split bias term tracks relatively slow changes in said throttle split angle but does not track relatively rapid changes in said throttle split angle.

6. A throttle split monitor as claimed in claim 5, wherein said throttle angle section rate limits said term formed by combining the results of said slow integration with said throttle split angle prior to said term being integrated.

7. A throttle split monitor as claimed in claim 6, wherein said throttle angle section absolutely limits said throttle split bias term prior to said throttle split bias term being summed with said throttle split angle.

8. A throttle split monitor as claimed in claim 4, wherein said throttle limit sections limits throttle commands by summing said throttle commands with a LIMIT ADJUSTMENT, said LIMIT ADJUSTMENT formed by combining a COMMAND SPLIT derived by subtractively summing said throttle commands with said throttle split bias term produced by said throttle angle section and the results of said integration produced by said tachometer section.

9. A throttle split monitor as claimed in claim 8, wherein said throttle limit section combines the results of said integration with said throttle split bias term and a constant to produce a POSLIM term and a NEGLIM term and compares said POSLIM term with said COMMAND SPLIT and said NEGLIM term with said COMMAND SPLIT, the results of one or the other of said comparison determining the value of LIMIT ADJUSTMENT.

10. A throttle split monitor as claimed in claim 9, wherein the value of LIMIT ADJUSTMENT is equal to 0.5 times the value of COMMAND SPLIT minus POSLIM if said comparison of COMMAND SPLIT and POSLIM determines the value of LIMIT ADJUSTMENT and wherein the value of LIMIT ADJUSTMENT is equal to 0.5 times COMMAND SPLIT minus NEGLIM if said comparison of COMMAND SPLIT and NEGLIM determines the value of LIMIT ADJUSTMENT.

* * * * *

UNITED STATES PATENT AND TRADEMARK OFFICE
CERTIFICATE OF CORRECTION

PATENT NO. : 5,001,644

DATED : March 19, 1991

INVENTOR(S) : K.E. Goheen et al.

It is certified that error appears in the above-identified patent and that said Letters Patent is hereby corrected as shown below:

| Column | Line | |
|---|---|---|
| 3 | 10 | Delete "trapped" and insert therefor --tripped-- |
| 4 | 46 | Delete "presents" and insert therefor --prevents-- |
| 5 | 24 | Delete "difference" and insert therfor --different-- |
| 6 | 21 | Delete "intetraged" and insert therefor --integrated-- |
| 6 | 32 | After "operate" insert --about-- |
| 6 | 67 | Delete "deflector" and insert therefor --detector-- |
| 7 | 6 | Delete "secondary" and insert therefor --second-- |
| 10 | 48 | Delete "SPLIT $\leq$" and insert therefor --SPLIT $\geq$-- |

Signed and Sealed this

Twelfth Day of January, 1993

Attest:

DOUGLAS B. COMER

Attesting Officer

Acting Commissioner of Patents and Trademarks